United States Patent [19]

Morris et al.

[11] 4,209,149
[45] Jun. 24, 1980

[54] CONTRACTED INLET FOR JET ENGINE BEING TRANSPORTED AS CARGO

[75] Inventors: John P. Morris, Seattle; Patrick A. Podenski, Everett, both of Wash.

[73] Assignee: Boeing Commercial Airplane Company, Seattle, Wash.

[21] Appl. No.: 864,566

[22] Filed: Dec. 27, 1977

[51] Int. Cl.² ............ B64D 27/18; B64D 33/02; F02K 11/00; F01D 24/04
[52] U.S. Cl. ............ 244/53 B; 244/58; 137/15.1; 415/119
[58] Field of Search ............ 244/53 B, 55, 58; 137/15.1; 60/39.09 D, 39.09 P, 223; 415/121 G, 127, 128, 119

[56] References Cited

U.S. PATENT DOCUMENTS

| | | | |
|---|---|---|---|
| 2,632,295 | 3/1953 | Price | 137/15.1 |
| 2,744,382 | 5/1956 | Sokol et al. | 60/39.09 P |
| 2,931,167 | 4/1960 | Leduc | 137/15.1 |
| 3,168,999 | 2/1965 | Warren et al. | 244/53 B |
| 3,253,404 | 5/1966 | Tonnies | 137/15.1 |
| 3,400,902 | 10/1968 | King | 244/53 B |
| 3,532,129 | 10/1970 | Ward et al. | 137/15.1 |
| 3,618,699 | 4/1970 | Evans et al. | 415/119 |
| 3,763,874 | 10/1973 | Wilde et al. | 244/53 B |
| 3,843,277 | 10/1974 | Ehrich | 137/15.1 |

OTHER PUBLICATIONS

Kranish, "Watching Washington", Western Aerospace, Aug. 1962, p. 6.

*Primary Examiner*—Carlton R. Croyle
*Assistant Examiner*—Thomas I. Ross
*Attorney, Agent, or Firm*—Ronald E. Suter; Bernard A. Donahue

[57] ABSTRACT

An apparatus and method for modifying a jet engine to be carried externally in an inoperative condition on an aircraft to minimize aerodynamic drag and oscillation of the engine. The apparatus includes an annular inlet extension adapted to be mounted to the operating air inlet which slightly extends and contracts the inlet to reduce air spillage. The disclosed method includes the removal of the fan blades from the fan section of the inlet, attaching an ice deflector dome to the engine core inlet, and attaching the inlet extension to the nacelle air inlet.

5 Claims, 5 Drawing Figures

CONTRACTED INLET FOR JET ENGINE BEING TRANSPORTED AS CARGO

BACKGROUND OF THE INVENTION

This invention relates generally to jet engines for aircraft, and more particularly to an apparatus and method for modifying a jet engine to be carried in an inoperative condition externally on an aircraft so as to reduce aerodynamic drag, buffeting, and engine oscillation.

Certain multi-engine jet transport aircraft are designed to permit an extra inoperative engine to be carried externally on the aircraft. This design feature permits an engine to be transported rapidly from place to place without sacrificing internal cargo capacity or in the event that the engine cannot be fitted into the internal cargo compartments. On a typical four-engine jet transport having the engines suspended below the wings on pylons, a spare engine is usually suspended below the wind just inboard of one of the two inboard engines by means of a spare engine pylon or strut. Normally, attachment points are provided on the undersurface of the wing to permit the temporary attachment of a spare engine pylon.

While convenient, the external carrying of an unmodified inoperative engine may create certain aerodynamic and structural dynamic problems. In flight, ram airflow is free to pass through the engine but the flow rate through the engine is much lower than it would be if the engine were in operation. As a result, a significant portion of the flow that would normally pass through the engine is forced to spill around the outside of the inlet, causing unusually high flow velocities and negative pressure around the outside of the inlet lip. These velocity and pressure irregularities have been found to be very sensitive to slight changes in the direction and Mach number of oncoming flow. At higher Mach numbers this nonsymmetrical unsteady flow acting on the spare engine nacelle may induce undamped lateral oscillations of the engine and may require an unacceptable restriction of aircraft Mach number. Also, spillage of flow also causes flow separation over the nacelle and a significant increase in aerodynamic drag and buffeting on the aircraft. This situation can be further aggravated if ice deposits form on the internal parts of the spare engine in flight and cause further blockage.

Various solutions have been proposed to minimize the problems created by an externally carried inoperative engine. Certain temporary modifications of the engine are currently known and used to minimize internal flow blockage. First, the fan blades are removed from the engine. Also, the engine core air inlet is covered with an ice deflector dome to prevent ice buildup from completely blocking the fan exit guide vanes. The dome is normally sized to provide a passage area at the location of the fan face approximately equal to the fan nozzle exit area. Also, some drag reduction may be achieved with certain engine configurations by placing a conical-shaped fairing over the core exhaust nozzle. While these three modifications have resulted in some improvement, it has been found that unacceptable air speed and Mach number limitations still must be placed on the aircraft to prevent undamped lateral oscillations of the spare engine, excessive drag and buffeting.

It has also been proposed that the entire air inlet of the spare engine be covered with a streamlined dome to direct air approaching the engine smoothly around the outside of the nacelle. A variation of such a dome is the apparatus described in U.S. Pat. No. 3,253,404 to Eduard Tonnies. While such a dome might eliminate some of the problems caused by air spillage from the engine, it causes excessive drag and buffeting by not allowing airflow to pass through the inlet and fill in the large void aft of the fan exit. Further, it has been found that it does not necessarily eliminate engine oscillations.

Various other devices for modifying the shape of the air inlet of a jet engine are found in the prior art. One such device is illustrated in U.S. Pat. No. 3,532,129 to Peter Arthur Ward. Ward discloses an air inlet for a gas turbine engine having a number of flaps mounted between the nacelle walls which can be extended forward so as to reduce the cross-sectional area of the air inlet. It appears that the objective of his invention is to block the forward propagation of noise from the engine compressor by creating choked flow at the inlet. Another device which might be employed to reduce flow spillage from an inoperative engine is described in U.S. Pat. No. 3,763,874 to Geoffrey Light Wilde and Leonard John Rodgers. In this patent the inventors disclose an air inlet lip which includes a number of translating, rotating segments which permit the changing of the effective radius of curvature of the lip. While both of these devices might be employed to solve the aerodynamic problems mentioned above, it appears that each would cause a significant and permanent increase in the weight and complexity of the nacelle structure as compared to the present invention.

Also relevant to the present invention is the variable area air intake disclosed in U.S. Pat. No. 2,931,167 to Rene Leduc. The invention disclosed therein relates to an air intake for a supersonic aircraft in which a conical center body cooperates with an axially movable outer nacelle to form a variable area annular air inlet. This invention would not be useful in solving the problems herein addressed because the outer nacelle, while movable, does not change in shape and because the engines to which the present invention relate do not have a conical center body of the type referred to by Leduc.

An object of this invention is to provide for an inlet extension which can be quickly and temprarily attached to the normal operating inlet of a jet aircraft engine to be carried externally in an inoperative condition on an aircraft which will significantly reduce local inlet lip velocities and negative pressure and delay the onset of undamped lateral oscillations of the engine. Another object of this invention is to provide for an inlet extension which will also substantially reduce flow separation and aerodynamic drag caused by flow spillage from such an inoperative engine. Another object of this invention is to provide for an improved method for modifying a jet aircraft engine which is to be carried externally on an aircraft in an inoperative condition so as to eliminate the necessity for unreasonable restrictions on airspeed and Mach number.

SUMMARY OF THE INVENTION

In summary, this invention can be most broadly described as an inlet extension adapted to be fixedly mounted to the operating air intake of a jet aircraft engine which is to be carried externally in an inoperative condition on an aircraft, which includes a removable annular inlet lip having a fixed hilite area which is less than the hilite area of the operating air inlet, and means for attaching the inlet lip to the nacelle. The invention can also be summarized as a method for modifying a jet aircraft engine to be carried externally in an inoperative condition externally on an aircraft, including the steps of removing fan blades, attaching an ice deflector dome to the engine core inlet, and mounting an inlet lip extension to the operating air inlet, which extension has a fixed hilite area less than the hilite area of the operating air inlet.

DESCRIPTION OF THE PREFERRED EMBODIMENT

Figure 1:
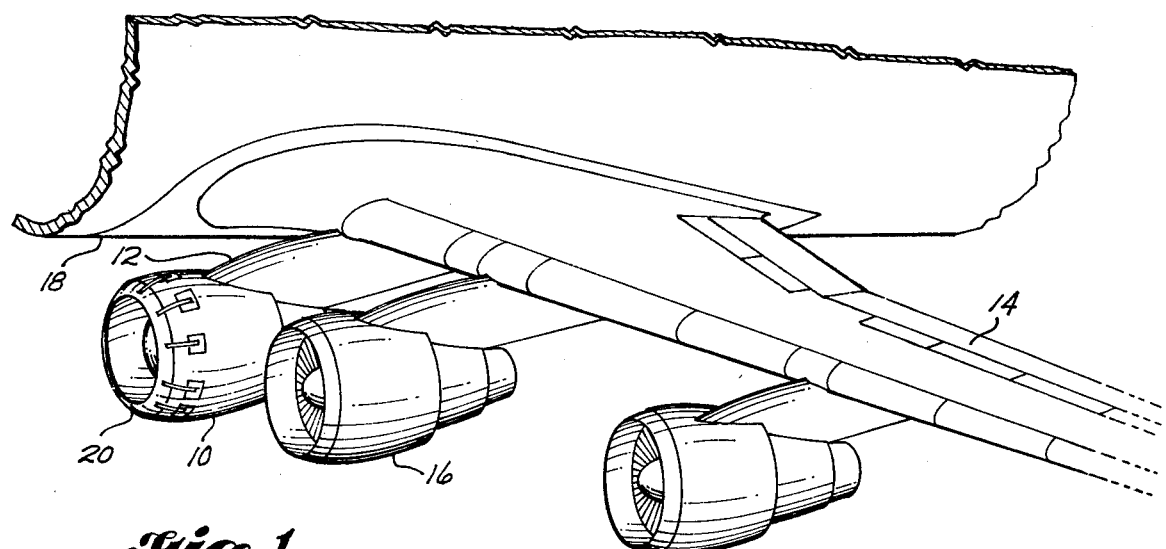
FIG. 1 shows a partial perspective view of a typical four-engine jet transport aircraft having a spare engine incorporating the present invention and pylon mounted in the spare-engine position.

FIG. 1 illustrates a portion of the wing of a typical four-engine jet aircraft to which a spare engine incorporating the present invention has been attached. Spare engine 10 and its associated pylon 12 have been secured to attachment points (not shown) on the underside of wing 14 approximately midway between the inboard operating engine 16 and the fuselage 18. Inlet extension 20 has been mounted over the lip of the operating inlet (not shown) by means more fully described below.

Figure 3:
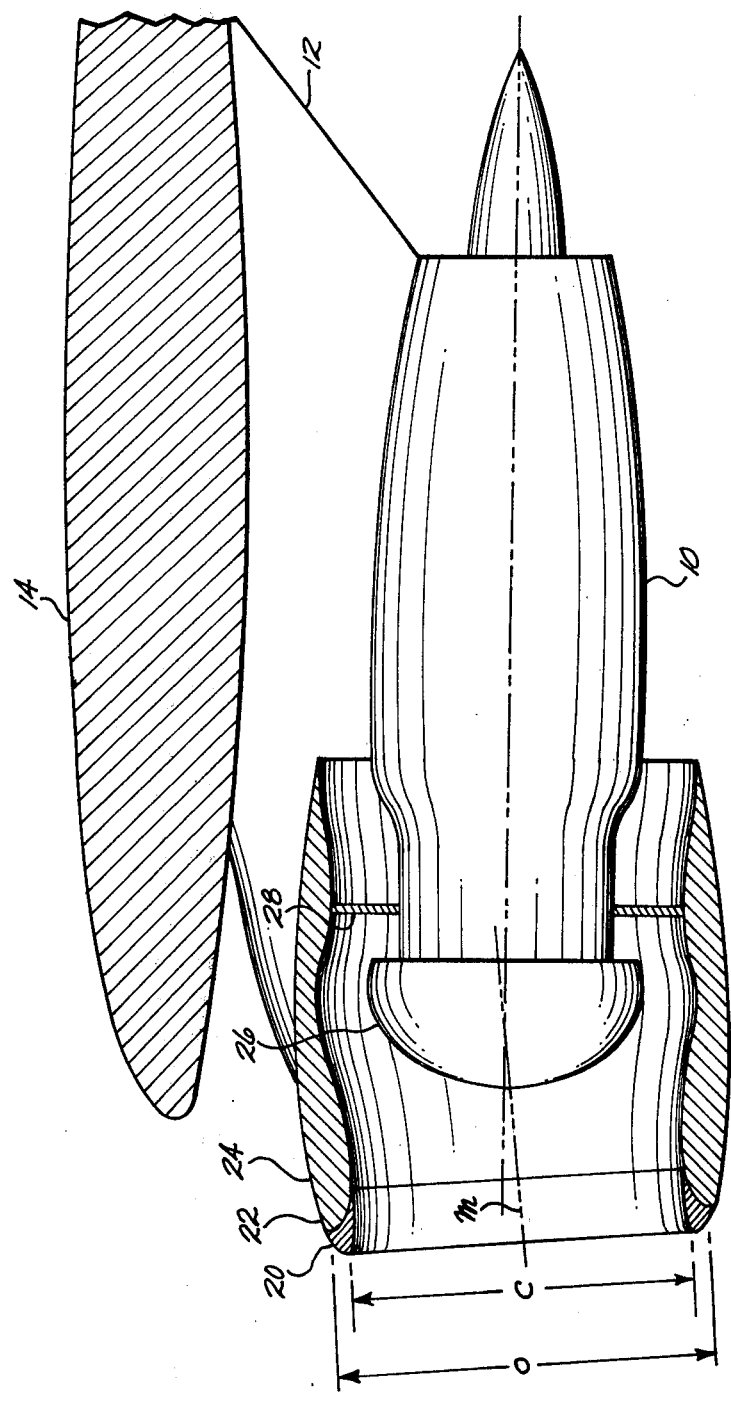
FIG. 3 is a partial sectional view of the spare engine installation of FIG. 1 taken from the side and at the location of the spare-engine pylon.

Referring to the schematic sectional view of FIG. 3, it can be seen that the geometric effect of adding the inlet extension 20 to the spare engine is to slightly extend and contract the forward edge of the engine air inlet. The contracted inlet so formed is characterized by a hilite area and a hilite diameter "c" which is somewhat smaller than the corresponding area and diameter "d" of the operating inlet. For the purposes of this disclosure the term "hilite area" is defined as the area enclosed within the locus of forwardmost points on an inlet lip projected forward parallel to the inlet centerline "m" onto a plane lying perpendicular to the inlet centerline.

Figure 2:
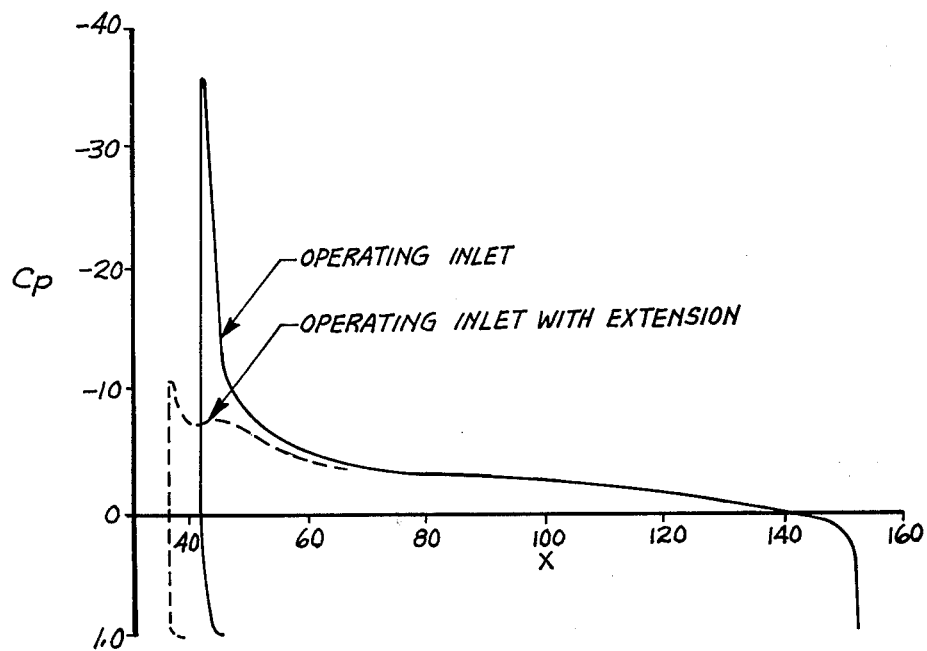
FIG. 2 is a graph showing the pressure coefficient along the outer surface of the engine nacelle near the air inlet lip plotted as a function of distance along the nacelle centerline beginning at a point just in front of the inlet.

The aerodynamic effect of the inlet extension is to significantly reduce air spillage around the outer edges of nacelle 24 and thereby significantly reduce the abnormally high velocities and negative pressures originally encountered with the unmodified operating inlet. The effect of the inlet extension on pressure coefficient over the surface of nacelle 24 is illustrated graphically in FIG. 2. It can be seen that the sharp increase in negative pressure coefficient measured near lip 22 of the unmodified operating inlet is noticeably reduced by the addition of the inlet extension.

Also shown in FIG. 3 is an ice deflector dome 26 representative of the type which is currently used to minimize the buildup of ice on fan exit guide vanes 28 as previously mentioned. The illustrated dome completely covers engine core air inlet (not shown) so as to prevent flow through the engine. Recently it has been found that transporting an engine externally with the compressor shaft immobilized may result in corrosion damage to the engine bearings. This damage can be prevented by allowing a restricted amount of ram air to pass through the engine core and permitting the compressor shaft to rotate freely. For this purpose an annular-shaped ice deflector dome (not shown) has been substituted in certain cases for the dome shown.

Figure 4:
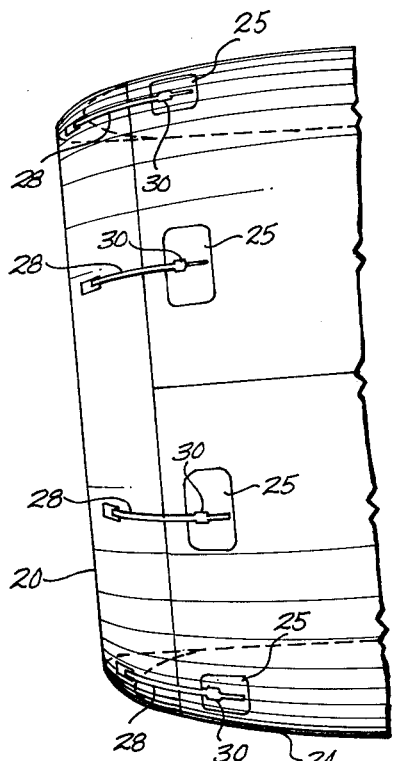
FIG. 4 is a side view of the forward portion of the spare engine nacelle and air inlet of FIG. 1.

Referring now to FIG. 4, it can be seen that inlet extension 20 is secured to nacelle 24 at attachment points 25 of radially spaced retaining straps 28 and common over-the-center latches 30. Obviously a variety of other removable type fasteners can be employed to secure the retaining straps to the cowling, and various other mechanisms familiar to those skilled in the art can be substituted for these strap-and-latch assemblies to secure the extension to the nacelle.

Figure 5:
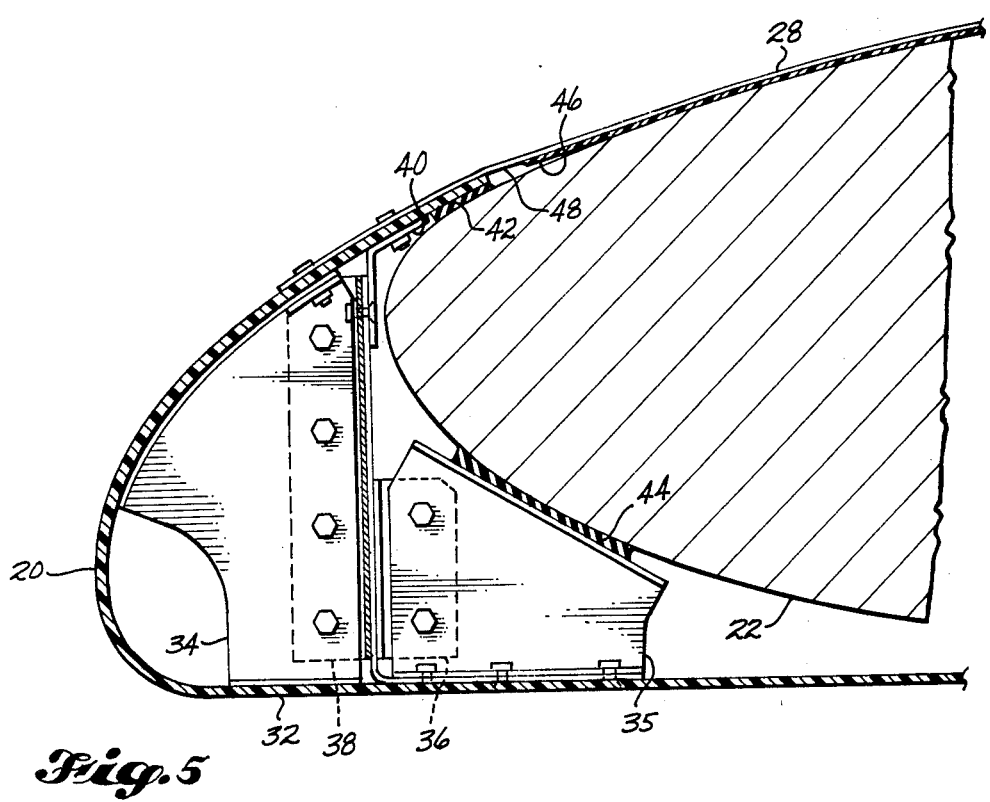
FIG. 5 is a partial sectional view in a plane extending through the nacelle centerline and the centerline of one of the retaining straps shown in FIG. 4, which illustrates the construction of the present invention in greater detail.

Details of the construction of the inlet extension assembly are shown in partial sectional view of FIG. 5. The assembly includes a molded annular inlet lip 32 formed from a 0.10-inch thick fiberglass sheet. The lip is supported by a plurality of ribs 34 equally spaced around the inner surface of the lip. Associated with each rib is a support bracket 35 which is used to properly position the extension on the operating inlet. Each support bracket is attached to the fiberglass lip and to an associated rib by means of brackets 36, 38 and 40. To prevent chafing of the surfaces of operating inlet 22, rubber pads 42 and 44 are positioned on the inner surface of lip 32 and each support bracket 34 as shown. For the same purpose a teflon coating 46 is placed on the inner surface 48 of each retaining strap 28.

It can be seen that the above-described invention provides both an apparatus and method for modifying an inoperative aircraft engine to be carried externally on an aircraft in flight. Although only one specific emodiment of this invention has been illustrated and described, it is to be understood that obvious modifications may be made of it without departing from the true spirit and scope of this invention.

We claim:

1. An inlet extension adapted to be fixedly mounted to the operating air inlet of a jet aircraft engine to be carried in an inoperative condition externally on an aircraft, said operating air inlet having a fixed hilite area, comprising:
   a removable annular inlet lip having a fixed hilite area less than the hilite area of the operating air inlet; and,
   means for attaching the inlet lip to the nacelle to reduce the hilite area of the engine while being carried in an inoperative condition.

2. The inlet extension of claim 1 wherein the hilite area of said inlet extension is aproximately fifteen per cent less than the hilite area of the operating air inlet.

3. The inlet extension of claim 1 wherein said means for attaching includes a plurality of retaining straps and latches.

4. A method for modifying a jet aircraft engine to be carried in an inoperative condition externally on an aircraft, said engine including a fan rotor and stators, a core inlet and exhaust nozzle, and an operating air inlet having a fixed hilite area, including
   removing the fan blades; and attaching an ice deflector dome to the engine core inlet;

the improvement comprising:

removably mounting an inlet extension to the operating air inlet, said extension having a fixed hilite area less than the hilite area of the operating air inlet.

5. A method as defined in claim 4 wherein the fixed hilite area of the inlet extension is approximately fifteen percent less than the hilite area of the operating air inlet.

* * * * *